3,503,995
PREPARATION OF ALPHA-AMINONITRILES
Ellis K. Fields, Chicago, Ill., assignor to Standard Oil Company, Chicago, Ill., a corporation of Indiana
No Drawing. Original application Apr. 30, 1965, Ser. No. 452,331. Divided and this application Nov. 30, 1966, Ser. No. 620,571
Int. Cl. C07c 121/04
U.S. Cl. 260—343.2
3 Claims

ABSTRACT OF THE DISCLOSURE

Alpha-aminonitriles are obtained from the ozonolysis of an organic compound containing at least one non-aromatic carbon to carbon double bond in the presence of hydrogen cyanide and ammonia in a liquid reaction medium.

---

This application is a division of application Ser. No. 452,331, filed Apr. 30, 1965, which in turn is a continuation-in-part of application Ser. No. 393,391, filed Aug. 31, 1964, now abandoned.

This invention relates to the ozonization of organic compounds. More particularly, it relates to liquid phase ozonization of organic compounds containing at least one carbon to carbon double bond in the presence of hydrogen cyanide and to hydroxy-substituted or amino-substituted nitriles formed from such compounds.

Recent developments of simplified techniques for ozone preparation make ozone increasingly an important oxidant in large-scale oxidation processes and diminish rapidly the traditional ill-fame associated with its hazards and cost. The key for the effective application of ozone lies in avoiding ozonite accumulation or isolation prior to the subsequent decomposition by further oxidation, reduction, or solvolysis. Ideally, the highly reactive and unstable ozonide should be converted quickly and simply to be desired product.

The reaction of ozone with unsaturated organic compounds has been known for many years, and has been the subject of extensive study. The art relating thereto has been collected and analyzed by Long in "The Ozonization Reaction," Chemical Reviews, 27, 437–493 (1940), and in a more recent extensive review by Bailey, Chemical Reviews, 58, 925 (1958).

I have discovered that liquid phase ozonization of organic compounds containing at least one carbon to carbon double bond under basic reaction conditions in a liquid reaction medium containing at least two moles of hydrogen cyanide per mole of said compound yields hydroxy nitriles as the primary ozonolysis products. Further, that amino nitriles are the primary products of the reaction when the liquid reaction medium also contains ammonia or an ammonia generating compound. The primary products of the reaction can be recovered per se or as the acetates thereof from the reaction mixture; or, if desired, be converted in situ to their corresponding hydroxy- or amino-substituted acids.

The method of the invention comprises ozonizing an organic compound containing at least one carbon to carbon double bond with ozone under basic reaction conditions in a liquid reaction medium containing at least two moles of hydrogen cyanide per mole of said compound and from 0 to 5 moles of ammonia per mole of said hydrogen cyanide. It is essential that the liquid reaction medium be maintained basic during the reaction with ozone. The reaction temperature is not critical and may range from −60° C. to +25° C. Preferably, the temperature is maintained from −10° C. to +20° C. to avoid loss of hydrogen cyanide. The reaction time is dependent upon rate of addition of ozone to the reaction medium. Besides hydrogen cyanide, any suitable cyanide generating compound can be used. Potassium cyanide or sodium cyanide are preferred reactants to provide hydrogen cyanide and maintain the requisite basicity during the reaction. Because ozone reacts with the cyanide, amounts of these reactants in excess of the stoichiometric proportions required to react with the double bond should be used.

The liquid reaction system can be homogeneous or heterogeneous, depending upon the choice of liquid for the reaction medium. Maximum conversion is obtained in an aqueous (heterogeneous) reaction system containing a stable emulsifier such as Brij 30 (a commercial polyoxyethylene lauryl alcohol). Other liquids that are suitable are anhydrous ammonia, concentrated ammonium hydroxide, alkanols, ethers, low molecular weight paraffinic hydrocarbons, such as butane, pentane, hexane, heptane, and low molecular weight chlorinated paraffins, such as methylene chloride, carbon tetrachloride, and chloroform. The only limitation is that the liquid or solvent be inert to ozone.

Any organic compound containing at least one carbon to carbon double bond susceptible to cleavage with ozone can be treated in accordance with the present invention to form valuable new chemical compounds useful per se or as chemical intermediates. Olefins can be converted to hydroxy nitriles (cyanohydrins) or amino nitriles or to their corresponding carboxylic acids. Cycloolefins can be cleaved to form the corresponding dihydroxy or diamino dinitriles or dicarboxylic acids containing two more carbon atoms. Lactones or lactams are obtained from aryl fused cycloolefins, such as indene and acenaphthylene. Illustrative of such compounds are: (A) substituted and unsubstituted aromatic hydrocarbons, such as benzene, naphthalene, anthracene, phenanthrene, chrysene, rubrene, and coronene; (B) homo- and co-polymers of polymerizable compounds, such as ethylene, propylene, isobutylene, styrene, acrylates, etc.; (C) aryl olefins, such as styrene, stilbene, allylbenzene, and divinylbenzene; (D) heterocyclic olefins, such as 2- and 4-vinylpyridine, vinyl quinoline, and 1,2-dipyridyl ethylene; (E) olefins containing substituents including (1) hydroxy, such as allyl alcohol, 1-butene-4-ol, and oleyl alcohol; (2) alkoxy, such as allyl methyl ether, crotyl butyl ether, and phenyl allyl ether; (3) keto, such as methyl vinyl ketone, 1-cyclohexene-3-one, and benzylidene acetone; (4) carboxy, carbalkoxy, and carboxamido, such as oleic acid, crotonic acid, and cinnamic acid and their esters and amides; (5) olefinic dicarboxylic anhydrides, such as propenyl succinic anhydride, and generally the anhydrides from olefins and maleic anhydride, such as dodecenylsuccinic anhydride; (6) acyl-amino, such as N-allylacetamide and N-oleylbenzamide; and (7) halo, such as allyl chloride, p-bromostyrene, and hexachloronorbornylbutene; (F) sulfone, such as sulfolene and divinyl sulfone; (G) alicyclic olefins and terpenes, such as alpha- and beta-pinene, camphene, and dipentene; and (H) steroids, such as cholesterol, cholestenone, and ergosterol.

The following examples are for illustrative purposes and are not meant to limit the invention in any way. In the examples, the temperatures are in degrees centigrade. The ozone was produced by a commercial ozonator in a concentration of 2.8–3.0 wt. percent in oxygen. The gas mixture of ozone and oxygen was introduced into the liquid reaction medium in a stirred reaction, and the vent gases passed through a neutral potassium iodide trap. Ozone introduction was stopped when the concentration of ozone increased in the vent gases as indicated by the color change in the potassium iodide trap. The usual analytical techniques of elemental analysis, infrared and mass spectroscopy, melting point and/or mixture melting points were used for product identification.

EXAMPLE 1

An emulsion of 37.5 g. (0.5 mole) of potassium cyanide, 250 ml. water, 0.5 g. Brij 30, and 37.3 g. (0.2 mole of 90%) cyclododecene was established by rapid mixing in a 1 liter flask. At 0° 33.7 ml. (0.4 mole) concentrated hydrochloric acid was added and then 14.4 g. (0.3 mole) ozone was passed into the emulsion in 132 minutes. Thereafter, an additional 15 ml. concentrated hydrochloric acid was added to induce separation of the emulsion, which took one hour at 25°. The semi-solid organic layer was separated from the aqueous phase and refluxed for 3 hours with 50 ml. ethanol, 20 ml. hydrochloric acid, and 200 ml. water. The mixture was evaporated to dryness on a steam bath, and the residue was dissolved in 5% aqueous sodium hydroxide. The alkaline solution was filtered, and the filtrate acidified. The precipitate was crystallized from boiling water to give 19.7 g. (34 mole percent) of white crystals melting at 123–5° and identified as 1,12 - dihydroxydodecane - 1,12 - dicarboxylic acid.

*Analysis.*—Calculated (percent): C, 57.9; H, 9.0; neutral equivalent 145. Found (percent): C, 57.6; H, 9.3; neutral equivalent 145.

EXAMPLE 2

A homogeneous solution of 0.2 mole cyclooctene and 0.6 mole hydrogen cyanide in 250 ml. ethanol containing 1 g. potassium hydroxide was ozonized at −10° with 0.3 mole ozone. Excess hydrogen cyanide was removed by blowing with air. The alcohol solution was refluxed with 50 ml. concentrated hydrochloric acid for 2 hours and evaporated. Ether was added, and the ether solution was extracted with base. Acidification of the alkaline extract gave 6.1 g. (13 mole percent) 2,9-dihydroxyaebacic acid.

EXAMPLE 3

An emulsion of 49.3 g. (1 mole) sodium cyanide, 250 ml. water, 22 g. (0.2 mole) cyclooctene, 0.5 g. Brij 30, and 37.2 ml. (0.65 mole) acetic acid was ozonized at −5° with 14.4 g. (0.3 mole) ozone. Thereafter, 80 ml. concentrated hydrochloric acid was added to the mixture, and mixture was warmed until emulsion broke. Ether was added, and ether solution extracted with potassium hydroxide. Acidification of the alkaline extract gave 20 g. (43 mole percent) 2,9-dihydroxycebacic acid, M.P. 134°.

*Analysis.*—Calculated (percent): C, 51.3; H, 7.7; neutral equivalent, 117. Found (percent): C, 51.4; H, 7.5; neutral equivalent, 118.

EXAMPLE 4

An emulsion of 65.1 g. (1 mole) potassium cyanide, 250 ml. water, 0.5 g. Brij 30, 22 g. (0.2 mole) cyclooctene, and 51.5 ml. (0.4 mole) acetic acid was ozonized at 20° with 14.4 g. (0.3 mole) ozone. Mixture was warmed to 80° and held for 0.5 hour, and cooled. To the cooled mixture was added 25 g. sodium chloride and 250 ml. ether forming three layers. Middle layer was filtered through Celite giving 20.5 g. (52 mole percent) 1,8-dihydroxy-1,8-dicyanooctane.

*Analysis.*—Calculated (percent): C, 61.2; H, 8.2; N, 14.3. Found (percent): C, 60.7; H, 8.0; N, 14.7.

EXAMPLE 5

An emulsion of 49.3 g. (1 mole) sodium cyanide, 250 ml. water, 23.2 g. (0.2 mole) indene, 0.5 g. Brij 30, and 37.2 ml. (0.65 mole) acetic acid was ozonized at −5° with 14.4 g. (0.3 mole) ozone. Reaction mixture extracted with ether. Extraction of the ether solution with potassium hydroxide, and acidification of the filtrate gave 32 mole percent of white solid M.P. 152–154° identified as 1-oxo-isochroman-3-carboxylic acid

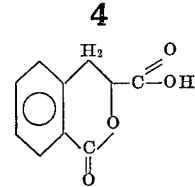

*Analysis.*—Calculated (percent): C, 62.4; H, 4.2; neutral equivalent, 192. Found (percent): C, 62.2; H, 4.2; neutral equivalent, 191.

EXAMPLE 6

An emulsion of 30.4 g. (0.2 mole) acenaphthylene in 250 ml. ether, 245 g. (0.5 mole) sodium cyanide, 200 ml. water, and 0.5 g. Brij 30 was treated at 0° with 25.74 ml. (0.45 mole) acetic acid, then ozonized with 14.4 g. (0.3 mole) ozone over 132 minutes. The mixture was warmed at 80° for 0.5 hour (after the ether had boiled off), cooled and mixed with 350 ml. ether. The ether layer was filtered from a brown solid, washed with water, and evaporated. The residue was refluxed with 50 ml. hydrochloric acid for 2 hours, then evaporated on the steam bath. This residue was dissolved in excess 5% potassium hydroxide, filtered, and acidified, giving 15.5 g. naphthalide-3-carboxylic acid (34 mole percent)

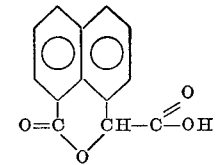

melting at 208–210° after 2 crystallizations from water.

*Analysis.*—Calculated for $C_{13}H_8O_4$ (percent): C, 68.4; H, 3.5; neutral equivalent, 228. Found (percent): C, 68.4; H, 4.0; neutral equivalent, 227.

EXAMPLE 7

An emulsion of 49 g. (1 mole) sodium cyanide, 300 ml. water, 53.5 g. (1 mole) ammonium chloride, 20 ml. concentrated ammonium hydroxide, 0.5 g. Brij 30, and 37.3 g. (0.2 mole of 90%) cyclododecene was ozonized with 14.4 g. (0.3 mole) ozone at −5° over a period of 132 minutes. The ozonized mixture was heated at 80° for 0.5 hour, and then was refluxed 3 hours with 300 ml. concentrated hydrochloric acid. The mixture was filtered, and the cooled filtrate was brought to pH 8 by the addition of ammonium hydroxide. The solid precipitate was filtered, washed with water, and dried; it weighed 7.1 g. (12 mole percent), with a M.P. 440°, and was identified as 1,12-diaminododecane-1,12-dicarboxylic acid.

*Analysis.*—Calculated (percent): C, 58.3; H, 9.7; N, 9.7. Found (percent): C, 58.0; H, 9.8; N, 9.6.

EXAMPLE 8

An emulsion of 65 g. (1 mole) potassium cyanide, 200 ml. water, 50.4 g. (0.2 mole) 1-octadecene, 275 ml. pentane, 0.5 g. Brij 30, and 37.2 ml. (0.65 mole) acetic was ozonized at 0° with 14.4 g. (0.3 mole) ozone for 132 minutes. The mixture was blown with air at 25° for 30 minutes to remove hydrogen cyanide; then 65 ml. concentrated hydrochloric acid added, and the mixture warmed at 80° for 20 minutes. When it was cooled, 2-hydroxystearonitrile separated as a solid upper layer. This was crystallized twice from hexane to give 50.6 g. (89 mole percent) of white crystals melting at 45–47°.

*Analysis.*—Calculated (percent): C, 76.3; H, 13.1; N, 4.9. Found (percent): C, 76.0; H, 12.9; N, 4.7.

A portion of the 2-hydroxystearonitrile, 2.83 g. (0.01 mole) was heated at 100° in a bomb with 5 ml. concentrated ammonium hydroxide and 2 g. ammonium carbonate. The product was refluxed 3 hours with excess hydrochloric acid, cooled, and filtered; the solid was refluxed 2 hours with 5 ml. ammonium hydroxide. The amino acid, 2-amino stearic acid, was collected on a filter, washed, dried, and crystallized from acetic acid with a little charcoal. It weighed 2.15 g. (72 mole percent) and melted at 224–5° dec. (literature melting point is 223°).

*Analysis.*—Calculated (percent): C, 72.2; H, 12.4; N, 4.7. Found (percent): C, 71.9; H, 12.2; N, 4.5.

Another portion of the 2-hydroxystearonitrile of this example, 5.66 g., was refluxed for 6 hours with 20 ml. benzene and 25 ml. concentrated hydrochloric acid, the benzene boiled off, and the mixture cooled, and filtered. Solids recrystallized from chloroform gave 6.1 g. (89 mole percent) of 2-hydroxystearic acid, M.P. 91–2°. Mixture melting point with authentic 2-hydroxystearic acid, 90–92°.

A 2 g. portion of the 2-hydroxystearonitrile of this example was warmed with 6 ml. of concentrated hydrochloric acid on the steam bath for 10 minutes. Recrystallization from ethanol of the filtered and dried solid gave 2 g. (95%) of 2-hydroxystearamide, M.P. 145° (literature melting point is 148°).

EXAMPLE 9

A solution of 32.8 (0.2 mole) 5-norbornene-2,3-dicarboxylic anhydride in 10 g. sodium hydroxide and 150 ml. water was mixed with 45.6 g. (0.7 mole) potassium cyanide in 100 ml. water and 37.2 ml. (0.65 mole) acetic acid; the mixture was ozonized at 0° with 19.6 g. (0.4 mole) ozone. The ozonized mixture was stirred at 25° for 30 minutes, treated with 200 ml. concentrated hydrochloric acid, and evaporated to dryness on steam bath. The residue was ground and extracted in Soxhlet apparatus for 48 hours with ether. The ether was vacuum evaporated at 60°, giving 4.6 g. viscous products that did not crystallize. Product was identified as the lactone of 1,2-dicarboxycyclopentane-3,5-diglycolic acid.

*Analysis.*—Calculated (percent): C, 45.8; H, 4.2; saponification equivalent, 72. Found (percent): C, 45.4; H, 4.4; saponification equivalent, 71.

EXAMPLE 10

An emulsion of 32.4 g. (0.2 mole) 1,5,9-cyclododecatriene (10% cis, trans, trans; 90% all trans) in 150 ml. of aqueous hydrogen cyanide (0.4 mole) and 0.1 mole potassium cyanide was ozonized at 0° with 14.4 g. (0.3 mole) ozone. After being extracted with ether and acetylated with acetic anhydride, the product distilled at 192–4° and 0.3 mm., giving 13.3 g. (20 mole percent) of 1,12-dicyanol-1,12-diacetoxydodecadiene-4,8

$$\begin{array}{c} NC-CH-CH_2-CH_2-CH \\ \phantom{NC-}| \phantom{CH_2-CH_2-}\| \\ \phantom{NC-}OAc \phantom{CH_2-}HC-CH_2-CH_2-CH \\ \phantom{NC-CH-CH_2-CH_2-CH_2-}\| \\ \phantom{NC-CH-CH_2-CH_2-}HC-CH_2CH_2-CH-CN \\ \phantom{NC-CH-CH_2-CH_2-CH_2-CH_2-CH_2-}| \\ \phantom{NC-CH-CH_2-CH_2-CH_2-CH_2-CH_2-}OAc \end{array}$$

*Analysis.*—Calculated for $C_{18}H_{24}N_2O$ (percent): C, 65.0; H, 7.2; N, 8.4. Found (percent): C, 64.7; H, 7.6; N, 8.1.

The compound was thermally stable at 250°. Its molecular weight: calculated, 332; found (by mass spectrometry), 332.

EXAMPLE 11

An emulsion of 31.72 ml. (0.2 mole) of alpha-pinene in 150 ml. water containing 0.4 mole of hydrogen cyanide, 0.1 mole of potassium cyanide, and 0.5 g. Brij 30 was ozonized at 0° with 14.4 g. (0.3 mole) ozone. The product was extracted with ether, acetylated with acetic anhydride, and distilled. The product recovered was 1,1-dimethyl - 2 - acetylcyclobutane-4-(2-acetoxy) propionitrile $$\begin{array}{c} \phantom{NC-}H \phantom{-CH_2--|----}CH_3 \\ NC-C-CH_2-|----CH_3 \\ \phantom{NC-}| \phantom{-CH_2--|-----}\phantom{CH_3} \\ \phantom{NC-}OAc \phantom{-CH_2--}| \phantom{----}O \\ \phantom{NC-CH-CH_2--}| \phantom{----}\| \\ \phantom{NC-CH-CH_2--}|----C-CH_3 \\ \phantom{NC-}H_2 \phantom{-CH_2-}H \end{array}$$

having a boiling point of 170–173° at 1 mm.

*Analysis.*—Calculated for $C_{13}H_{19}NO_3$ (percent): C, 65.8; H, 8.0; N, 5.9. Found (percent): C, 65.9; H, 8.4; N, 5.7.

The mass spectrum gave the molecular weight as 237; calculated, 237.

EXAMPLE 12

An emulsion of 33.6 (0.2 mole) 1-dodecene in 150 ml. concentrated ammonium hydroxide containing 0.4 mole of hydrogen cyanide and 0.5 Brij 30 was ozonized at −5° with 14.4 g. (0.3 mole) ozone. After being extracted with ether and acetylated, it gave 10.5 g. (22 mole percent) of 2-acetaminolauronitrile, $B_{0.7}$ 187–190°, M.P. 60°.

*Analysis.*—Calculated for $C_{14}H_{26}H_2O$ (percent): C, 70.6; H, 10.9; N, 11.8. Found (percent): C, 70.3; H, 11.1; N, 11.6.

EXAMPLE 13

An emulsion of 33.6 g. (0.2 mole) 1-dodecene in 150 ml. water containing 0.4 mole hydrogen cyanide and 0.1 mole potassium cyanide was ozonized with 14.4 g. (0.3 mole) ozone at 0°. After being extracted with ether and acetylated, the product distilled at 124–7° and 0.5 mm., giving 19.6 g. (41 mole percent), of 2-acetoxylauronitrile.

*Analysis.*—Calculated for $C_{12}H_{25}NO_2$ (percent): C, 70.3; H, 10.5; N, 5.9. Found (percent): C, 70.6; H, 10.8; N, 6.0.

EXAMPLE 14

An emulsion of 21.6 g. (0.2 mole) 1,5-cyclooctadiane (cis, cis) in 150 ml. water cotaining 0.6 mole hydrogen cyanide and 0.1 mole potassium cyanide was ozonized with 14.4 g. (0.3 mole) ozone at 0°. After being extracted with ether and acetylated, the product distilled at 170° and 0.2 mm. (with slight decomposition), giving 15 g. (27 mole percent) of 1,8-dicyano-1,8-diacetoxy-octene-4

$$\begin{array}{c} NC-CH-CH_2-CH_2-CH=CH_2-CH_2-CH-HC \\ \phantom{NC-}| \phantom{CH-CH_2-CH_2-CH=CH_2-CH_2-CH-}| \\ \phantom{NC-}OAc \phantom{CH-CH_2-CH_2-CH=CH_2-CH_2-CH-}OAc \end{array}$$

*Analysis.*—Calculated for $C_{14}H_{18}N_2O_4$ (percent): C, 60.4; H, 6.5; N, 10.1. Found (percent): C, 60.8; H, 6.8; N, 9.8.

EXAMPLE 15

A solution of 22 g. (0.2 mole) cyclooctene in 250 ml. ether containing 0.5 mole hydrogen cyanide, and 1 g. sodium cyanide in 2 ml. water was ozonized with 14.4 g. (0.3 mole) ozone at 0°, then acetylated, and distilled. The product, 19 g. (34 mole percent) $B_{0.5}$ 190–193°, was 2,9-diacetoxysebaconitrile.

*Analysis.*—Calculated for $C_{14}H_{20}N_2O_4$ (percent): C, 60.0; H, 7.1; N, 10.0. Found (percent): C, 59.8; H, 7.3; N, 9.8.

Molecular weight: calculated, 280. Found (mass spectrum), 280.

EXAMPLE 16

A mixture of 38.6 g. (0.1 mole) of cholesterol, and 0.4 mole of hydrogen cyanide in 250 ml. ether, and 2 g. of sodium cyanide in 4 ml, water was ozonized at 20° with 14.4 g. (0.3 mole) ozone. Concentrated hydrochloric acid, 4 ml., was added: the ether layer was separated, and evaporated on the steam bath, giving 40.8 g. yellow solid that melted at 132° with decomposition.

Analysis.—Calculated for $C_{28}H_{47}NO_3$ (percent): C, 75.5; H, 10.6; N, 3.1. Found (percent): C, 74.7; H, 10.6; N, 2.6.

The product is

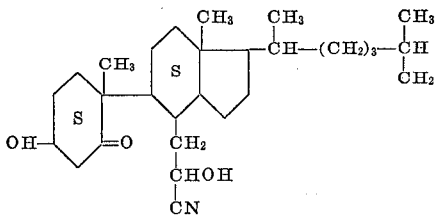

as shown by its analysis and infrared spectrum. The band at 1690 cm.$^{-1}$ is the ketone carbonyl; OH band is at 3480 cm.$^{-1}$; and 2 C—OH bands, at 1070 cm.$^{-1}$ and 1005 cm.$^{-1}$ show the two different OH groups.

EXAMPLE 17

A solution of 72.8 g. (0.2 mole) methyl abietate in 350 ml. ether containing 1.37 moles hydrogen cyanide and 10 ml. piperidine was ozonized at 0° with 28.8 g. (0.6 mole) ozone. Concentrated hydrochloric acid, 15 ml. was added: the ether layer was dried, and evaporated, giving 89.2 g. viscous cyanohydrin of structure:

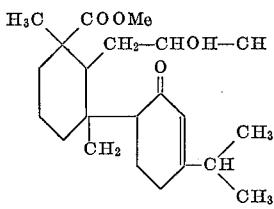

Analysis.—Calculated for $C_{22}H_{32}NO_4$ (percent): C, 70.6; H, 8.6; N, 3.7. Found (percent): C, 71.4; H, 9.4; N, 4.0.

EXAMPLE 18

An emulsion of 19.2 g. (0.2 mole) of 1-methylcyclohexene-1, 24.5 g. (0.5 mole) of sodium cyanide, 150 ml. water, and 0.5 g. Brij 30 was treated at −10° with 33.7 ml. (0.4 mole) of concentrated hydrochloric acid, then ozonized with 14.4 g. (0.3 mole) ozone at 20°. Ether, 250 ml., and 25 g. sodium chloride were added; the other layer was separated, dried, and treated with 75 ml. of acetic anhydride and 1 ml. of concentrated hydrochloric acid. After being heated on the steam bath for 30 minutes, it was evaporated in a Rinco evaporator at 40° and 0–2 mm., to give 17 g. light yellow, syrupy product that analyzed 59.2% C; 7.7% H; and 9.1% N.

Calculated for

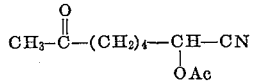

(percent): C, 60.9; H, 7.6; N, 7.1.

Calculated for

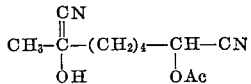

(percent): C, 58.9; H, 7.1; N, 12.5.

The elemental analysis indicates a product that is a mixture of the mono- and di-cyanohydrin acetate. The infrared spectrum is consistent with such a mixture, showing the OH band at 3950 cm.$^{-1}$, the CH$_2$ symmetrical stretching band at 2900 cm.$^{-1}$, an ester C=O at 1725 cm.$^{-1}$ with a shoulder at 1695 cm.$^{-1}$ showing the ketone, the CH$_3$ in

symmetrical bending band at 1360 cm.$^{-1}$, and the C—OH stretching band for a tertiary alcohol at 1220 cm.$^{-1}$.

EXAMPLE 19

An emulsion of 16.8 g. (0.2 mole) of cyclohexene, 24.5 g. (0.5 mole) of sodium cyanide, 150 ml. water, 0.5 g. Brij 30, and 33.7 g. (0.4 mole) concentrated hydrochloric acid was ozonized at 0° with 14.4 g. (0.3 mole) ozone. Ether and sodium chloride were added, the ether layer was acetylated as in Example 18, and distilled, giving 10.1 g. (20 mole percent) of 2,6-diacetoxysuberonitrile.

Analysis.—Calculated for $C_{12}H_{16}N_2O_4$ (percent): C, 57.2; H, 6.3; N, 11.1. Found (percent): C, 57.2; H, 6.7; N, 10.9.

The molecular weight, 252, was deduced from the mass spectrum; a peak at 253 was the protonated parent peak, arising from a bimolecular reaction, as shown by its pressure dependence.

EXAMPLE 20

An emulsion of 44.8 g. (0.2 mole) 1-hexadecene in 200 ml. pentane and 150 ml. water containing 0.4 mole hydrogen cyanide, 0.1 mole sodium cyanide, and 0.5 g. Brij 30 was ozonized at 0° with 14.4 g. (0.3 mole) ozone. After 10 ml. concentrated hydrochloric acid was added, the mixture was air blown at 50° for 30 minutes to remove pentane and excess hydrogen cyanide, then chilled to 0°. The precipitate was filtered, and dried, giving 39.5 g. (78 mole percent) of 2-hydroxypalmitonitrile. A portion was heated with 2× its weight of concentrated hydrochloric acid at 100° for 5 minutes and gave a quantitative yield of 2-hydroxypalmitamide, M.P. 148° (literature melting point is 149.5°).

A portion of the 2-hydroxypalmitamide was converted to N-n-butyl-2-hydroxypalmitamide

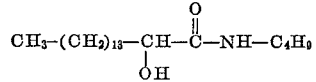

in quantitative yield by refluxing with 2 times its weight of n-butylamine for 20 hours with ammonia evolution. The solid was recrystallized from hexane, and melted at 98°.

Analysis.—Calculated for $C_{20}H_{41}NO_2$ (present): C, 73.4; H, 12.5; N, 4.3. Found (percent): C, 73.2; H, 12.4; N, 4.6.

EXAMPLE 21

An emulsion of 1-hexadecene in 200 ml. pentane and 200 ml. aqueous solution containing 56.6 ml. concentrated ammonium hydroxide, 0.4 mole hydrogen cyanide, and 0.1 mole sodium cyanide was ozonized with 14.4 g. (0.3 mole) ozone at 0°. The mixture was heated for 30 minutes at 80° with air blowing; 100 ml. concentrated hydrochloric acid was added, and heating continued at 80° for 5 minutes. The mixture was cooled to 10°; the solid top layer was filtered, washed, and dried. 41.3 g. (71 mole percent) of 2-aminopalmitonitrile hydrochloride, melting at 94° after crystallization from hexane, was recovered.

Analysis.—Calculated for $C_{16}H_{33}N_2Cl$ (percent): C, 66.6; H, 11.4; N, 9.7; Cl, 12.3. Found (percent): C, 66.3; H, 11.1; N, 9.4; Cl, 11.9.

EXAMPLE 22

A mixture of 59.3 g. (0.2 mole) methyl oleate in 250 ml. ether containing 0.5 mole of hydrogen cyanide, and 2 g. (0.04 mole) of sodium cyanide in 4 ml. water was ozonized at 0° with 14.4 g. (0.3 mole) ozone. After being treated with 8 ml. concentrated hydrochloric acid, the mixture was blown with air at 25° for 30 minutes to remove excess hydrogen cyanide. Acetic anhydride, 95.2 ml. (1 mole), was added, the mixture heated at 100° for 30 minutes, then distilled. At 75–7° and 0.2 mm., 18.15 g. (43 mole percent) of 2-acetoxycapric nitrile distilled.

*Analysis.*—Calculated for $C_{12}H_{21}NO_2$ (percent): C, 70.5; H, 10.0; N, 6.6. Found (percent): C, 70.7; H, 10.3; N, 6.4.

At 156–160° and 1.2 mm., 16.8 g. (33 mole percent) of methyl 9-cyano-9-acetoxy pelargonate distilled.

*Analysis.*—Calculated for $C_{13}H_{21}NO_2$ (percent): C, 61.2; H, 8.2; N, 5.5. Found (percent): C, 61.6; H, 8.5; N, 5.3.

The reaction is $$CH_3(CH_2)_7CH=CH(CH_2)_7-COOMe + O_3$$
$$\xrightarrow{Ac_2O} CH_3(CH_2)_7-\underset{OAc}{CH}-CN + NC-\underset{OAc}{CH}-(CH_2)_7-COOMe$$

EXAMPLE 23

A solution of 36 g. (0.2 mole) trans-stilbene in 500 ml. ether was emulsified in 120 ml. aqueous hydrogen cyanide solution containing 0.5 mole of hydrogen cyanide and 5 g. (0.1 mole) sodium cyanide with 0.5 g. Brij 30. The mixture was ozonized at 15° with 14.4 g. (0.3 mole) ozone, then acidified with 10 ml. concentrated hydrochloric acid. The ether layer was extracted with 10% aqueous sodium hydroxide to remove 0.7 g. of benzoic acid, then evaporated on the steam bath, and chilled; 5.1 g. stilbene crystallized and was filtered off. The filtrate was acetylated with 20.4 g. (0.2 mole) of acetic anhydride and 0.5 ml. concentrated hydrochloric acid at 100° for 1 hour, then distilled, giving 29.7 g. (49 mole percent) of mandelonitrile acetate boiling at 120–125° and 2 mm. The mass spectrum showed the correct molecular weight, 175.

EXAMPLE 24

A mixture of 23.6 g. (0.2 mole) allylbenzene, 96 ml. (0.8 mole) aqueous hydrogen cyanide, 90.6 ml. (1.6 mole) concentrated ammonium hydroxide, and 0.25 g. Brij 30 was ozonized at 0° with 14.4 g. (0.3 mole) ozone. Another 0.2 mole aqueous hydrogen cyanide and 22.6 ml. (0.4 mole) concentrated ammonium hydroxide were added, and the stirring continued at 20° for 3 hours. The mixture was acidified with 240 ml. concentrated hydrochloric acid, and evaporated to dryness on the steam bath. The residue was extracted with 100 ml. methanol at 20°; the methanol was filtered, and treated with 20 ml. aniline. The solid was collected, and dried, giving 6.6 g. dl-phenylalanine, melting at 263° after crystallization from water (literature melting point is 263–5°).

EXAMPLE 25

An emulsion of 94 g. (1 mole) norbornylene in 100 ml. hexane and 200 ml. water containing 1.5 moles hydrogen cyanide, 1 g. Brij 30, and 0.2 mole sodium cyanide was ozonized at 0° with 1.2 moles ozone. After being extracted with ether and acetylated with acetic anhydride, the product was evaporated in a Rotavapor evaporator, giving 54.5 g. viscous yellow dicyanohydrin diacetate

*Analysis.*—Calculated for $C_{13}H_{16}N_2O_4$ (percent): C, 59.1; H, 6.1; N, 10.6; molecular weight, 264. Found (percent): C, 59.8; H, 6.9; N, 9.9; molecular weight (mass spectrum) 264.

EXAMPLE 26

A mixture of 45.1 g. (0.44 mole) 1,5-hexadiene, 80.8 ml. (0.5 mole) hexachlorocyclopentadiene, and 1 g. hydroquinone was heated at reflux for 18 hours, then at 130° for 2 hours. Distillation of the mixture gave 72 g. (46 mole percent) of the adduct, 1-hexachloronorbornylbutene-4, boiling at 123–125° at 1 mm.

*Analysis.*—Calculated for $C_{11}H_{10}Cl_6$ (percent): C, 37.2; H, 2.8; Cl, 60.0. Found (percent): C, 37.4; H, 2.9; Cl, 59.3.

A solution of 60.5 g. (0.171 mole) of the adduct, 1 mole hydrogen cyanide, and 2 ml. piperidine in ether was ozonized at 0° with 14.4 g. (0.3 mole) ozone. Three ml. concentrated hydrochloric acid was added; the ether layer was separated, and evaporated in a Rotavapor evaporator at 60° and 0.2 mm., giving 59.1 g. of very viscous product that analyzed for 2-hydroxy-4-hexachloronorbornyl butyronitrile

*Analysis.*— Calculated for $C_{11}H_9NOCl_6$ (percent): C, 34.4; H, 2.3; N, 3.6; Cl, 55.4. Found (percent): C, 35.1; H, 2.5; N, 3.2; Cl, 54.9.

EXAMPLE 27

Isodrin was prepared by reacting (2.2.1)-bicyclo-2,5-heptadiene with hexachlorocyclopentadiene. The adduct, melted at 101°. An emulsion of 72.9 g. (0.2 mole) of this adduct in 200 ml. pentane and 150 ml. water containing 0.4 mole hydrogen cyanide, 0.1 mole sodium cyanide, and 0.5 g. Brij 30 was ozonized at 0° with 14.4 g. (0.3 mole) ozone. A mixture of 20 ml. concentrated hydrochloric acid and 150 ml. ether was added; the ether layer was dried, and evaporated in a Rotavapor evaporator at 65° and 0.2 mm., giving 81.4 g. viscous yellow product:

*Analysis.*—Calculated for $C_{13}H_7NO_2Cl_6$ (percent): C, 37.0; H, 1.7; N, 3.3; Cl, 50.2. Found (percent): C, 38.2; H, 2.4; N, 3.3; Cl, 49.4.

EXAMPLE 28

A mixture of 80.8 ml. (0.5 mole) hexachlorocyclopentadiene and 108 g. (1 mole) 1,5-cyclooctadiene was heated at 130° for 14 hours, then distilled, giving 42 g. unreacted cyclooctadiene and 57 g. of the adduct, hexachloronorbornylene-cyclooctene, $B_{0.38}$ 145°, M.P. 63°.

*Analysis.*—Calculated for $C_{13}H_{12}Cl_6$ (percent): C, 41.0; H, 3.1; Cl, 55.9. Found (percent): C, 40.9; H, 3.3; Cl, 55.5.

The distillation residue, 53.1 g., was the adduct of 2 moles hexachlorocyclopentadiene with 1 mole cyclooctadiene.

A mixture of 19 g. (0.05 mole) of the hexachloronorbornylene-cyclooctene adduct in 150 ml. ether containing 0.4 mole hydrogen cyanide, and 4 g. sodium cyanide in 20 ml. water was ozonized at 10° with 4.8 g. (0.1 mole) ozone. Hydrochloric acid, 10 ml., was added; the ether layer was evaporated, and the residue acetylated with 18.8 ml. (0.2 mole) acetic anhydride and 1 ml. concentrated hydrochloric acid. The mixture was evaporated in vacuo; the residue, in ethanol, treated with charcoal, filtered, and evaporated, gave 17.5 g. of a viscous oil that had the structure

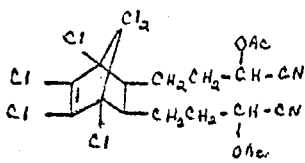

*Analysis.*—Calculated for $C_{15}H_{14}N_2O_2Cl_6$ (percent): C, 41.4; H, 3.3; N, 5.1; Cl, 38.7. Found (percent): C, 41.2; H, 3.7; N, 4.7; Cl, 38.6.

EXAMPLE 29

Dicyclopentadiene, 27.1 ml. (0.2 mole) was ozonized and acetylated according to Example 13. The product 8.6. g. could not be distilled without decomposition except on a small scale. About 0.1 g. was obtained boiling at 165–168° and 0.2 mm. having a mass spectrum molecular weight of 302 for the unresolved mixture of

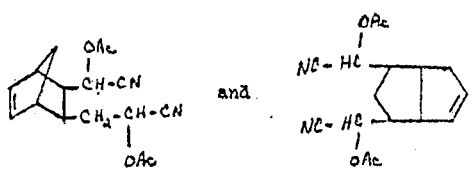

Analysis of undistilled residue: Calculated for

(percent): C, 63.6; H, 6.0; N, 9.3. Found (percent): C, 64.4; H, 7.0; N, 8.8.

EXAMPLE 30

A solution of 80 g. (0.1 mole) of polybutene (ave. mol wt. 800; vis at 210°, 981 SSU; 390° F. flash point) in 200 ml. hexane and 100 ml. ether containing 0.3 mole hydrogen cyanide and 1 ml. piperidine was ozonized at 10° with 14.4 g. (0.3 mole) ozone. The solution was evaporated in a Rotavapor evaporator at 50° and 0.1 mm. to give 81.4 g. of water-white viscous product that analyzed 0.8 N and showed a strong OH band for the polybutene cyanohydrin in the infrared at 3450 cm.$^{-1}$.

EXAMPLE 31

A solution of 112 g. (0.1 mole) of polypropylene (ave. mol wt. 1120; vis at 210° F., 800 SSU; 455° F. flash point) in 300 ml. hexane was cyanozanized according to Example 30, giving 111 g. of water-white viscous polypropylene cyanohydrin that contained 0.54% N and showed the OH band at 3450 cm.$^{-1}$ in the infrared.

EXAMPLE 32

A solution of 115.2 g. (0.2 mole) of polypropylene, (ave. mol wt. 576) in hexane was cyanozonized according to Example 30. Evaporation in a Rotavapor evaporator left 118.5 g. of viscous white polypropylene cyanhydrin, analyzing 81.0% C; 13.5% H; and 1.2% N; and showing the OH band at 3450 cm.$^{-1}$ in the infrared.

EXAMPLE 33

A mixture of 115.2 g. (0.2 mole) light polypropylene (576 ave. mol. wt.) in 100 ml. hexane, 275 g. ether containing 1 mole hydrogen cyanide and 3 ml. piperidine, 0.25 g. Brij 30, and 4 g. sodium hydroxide in 10 ml. water was ozonized at 5–10° with 24 g. (0.5 mole) ozone. An additional 0.2 mole hydrogen cyanide was added in ether, and the mixture stirred 1 hour at 20°. It was acidified with 15 ml. concentrated hydrochloric acid. The ether-hexane layer was separated, and evaporated in a Rotavapor evaporator, giving 127 g. of orange, viscous polypropylene cyanohydrin that analyzed 79.2% C; 13.1% H; and 2.6% N.

EXAMPLE 34

A mixture of 51.5 g. (0.02 mole) of polyisobutylene (ave. mol. wt. 2300, vis. 15,000 SSU at 210° F., 460° F. flash point) in 200 ml. pentane, 150 ml. of ether containing 10.8 g. (0.4 mole) hydrogen cyanide, and 2 g. (0.04 mole) sodium cyanide in 4 ml. water was ozonized at 20° with 9.6 g. (0.2 mole) ozone. After 4 ml. concentrated hydrochloric acid was added to make the mixture acid, the ether-pentane solution was filtered from the sodium chloride, and evaporated on the steam bath to give 52.6 g. of yellow viscous high-molecular weight hydroxynitrile product that analyzed 83.9% C; 14.6% H; and 0.17% N.

20 g. of the hydroxynitrile product and 4 g. tetraethylenepentamine were heated at 100° C. for 8 hours in a bomb. The mixture was cooled, dissolved in pentane, filtered through Celite, and the clear pentane solution was evaporated on the steam bath to give 20 g. of a clear, light orange alpha-aminonitrile product that analyzed 80.8% C; 13.6% H; and 1.8% N.

A 0.5 weight percent solution of this aminonitrile product in kerosene suspended one g. of fine charcoal for 16 hours, whereas the same charcoal suspension in kerosene without the product was completely settled in 10 minutes.

EXAMPLE 35

A mixture of 40 g. of polyethylene grease (a polyethylene of 2000 ave. mol. wt.) in 300 ml. hexane, 21 ml. ether containing 0.3 mole hydrogen cyanide, and 2 g. sodium cyanide in 4 ml. water was ozonized at 0° with 9.6 g. (0.2 mole) ozone. A one-quarter portion of the hexane mixture was withdrawn, and evaporated giving 10 g. of polyethylene cyanohydrin, analyzing 0.22% N.

The remainder of the mixture was heated with 20 ml. concentrated hydrochloric acid at 70° for 48 hours with stirring. The mixture was dried, and evaporated, giving 29.1 g. of light brown, viscous polyethylene alpha-hydroxy acid that analyzed 82.2% C; 13.9% H; and acid number 28.

The term "cyanozonolysis" has been coined to describe the one-step method of this invention wherein the simultaneous reaction of an organic compound containing at least one carbon to carbon double bond, hydrogen cyanide, and ozone is effected either in the absence or presence of ammonia or an ammonia generating compound to form hydroxy-substituted or amono-substituted nitriles. The preferred method for isolating cyanozonolysis products is to acetylate the crude ozonized reaction mixture, and then distill the acetylated mixture.

The foregoing examples thus illustrated that the process of this invention—cyanozonolysis—provides a simple and economical means for converting, in one step, organic compounds containing at least one carbon to carbon double bond into valuable derivatives. Obviously, many variations in reaction, and workup and conversion procedures can be used to increase the versatility of the process. For example, volatile or low boiling unsaturated compounds can be treated in accordance with the invention by the simultaneous introduction of separate streams of the respective reactants into the basic liquid reaction medium.

I claim:
1. The method of forming alpha-aminonitriles from organic compounds containing at least one non-aromatic carbon to carbon double bond which comprises: ozonizing at least one non-aromatic carbon to carbon double bond of an organic compound containing at least one non-aromatic carbon to carbon double bond with ozone under basic liquid reaction conditions in an inert liquid reaction medium containing at least two mols of hydrogen cyanide per mol of said compound and at least one mol of ammonia per mol of said hydrogen cyanide.

2. The method of claim 1 wherein said reaction medium comprises water and an emulsifier.
3. The method of claim 1 wherein said organic compound contains at least six carbon atoms.

References Cited

UNITED STATES PATENTS 3,344,179  9/1967  Takahashi _____ 260—534

JAMES A. PATTEN, Primary Examiner

U.S. Cl. X.R.

260—287, 289, 294.9, 295, 332.1, 346.8, 413, 464, 465, 465.4, 465.5, 465.6, 482, 514, 533, 535, 561, 648

PO-1050
(5/69)

UNITED STATES PATENT OFFICE
CERTIFICATE OF CORRECTION

Patent No. 3,503,995         Dated   March 31, 1970

Inventor(s)    Ellis K. Fields

It is certified that error appears in the above-identified patent and that said Letters Patent are hereby corrected as shown below:

Column 3, lines 37-38, "2,9-dihydroxyaebacic" and line 49, "2,9-dihydroxycebacic" should read -- 2,9-dihydroxysebacic --. Column 4, line 15, "245" should read -- 24.5 --; line 63, after "acetic" insert -- acid --. Column 5, line 26, after "32.8" insert -- g. --; line 62, the formula reading "$C_{18}H_{24}N_2O$" should read -- $C_{18}H_{24}N_2O_4$ --. Column 6, that portion of the formula, lines 3-9, reading Column 6, line 25, the formula reading "$C_{14}H_{26}H_2O$" should read -- $C_{14}H_{26}N_2O$ --; that portion of the formula, lines 49-50, reading

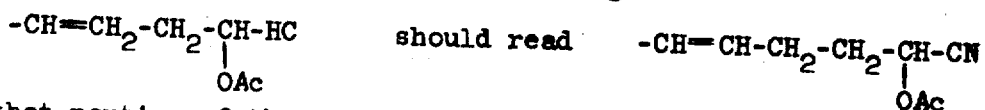

Column 7, that portion of the formula, lines 5-13, reading

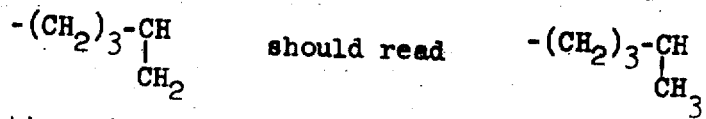

Column 7, that portion of the formula, lines 27-35, reading

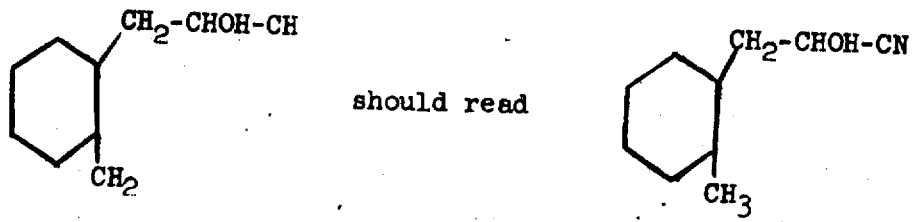

Column 9 that portion of the equation, lines 10-13, reading

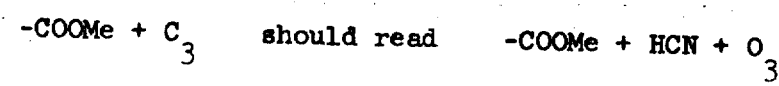

Column 12, line 64, "amono-" should read -- amino- --.

SIGNED AND
SEALED
SEP 29 1970

(SEAL)
Attest:

Edward M. Fletcher, Jr.
Attesting Officer

WILLIAM E. SCHUYLER, JR.
Commissioner of Patents